Jan. 14, 1958      D. C. ROTH      2,820,149
APPARATUS FOR PREVENTING THEFT OF A VEHICLE
Filed April 15, 1957
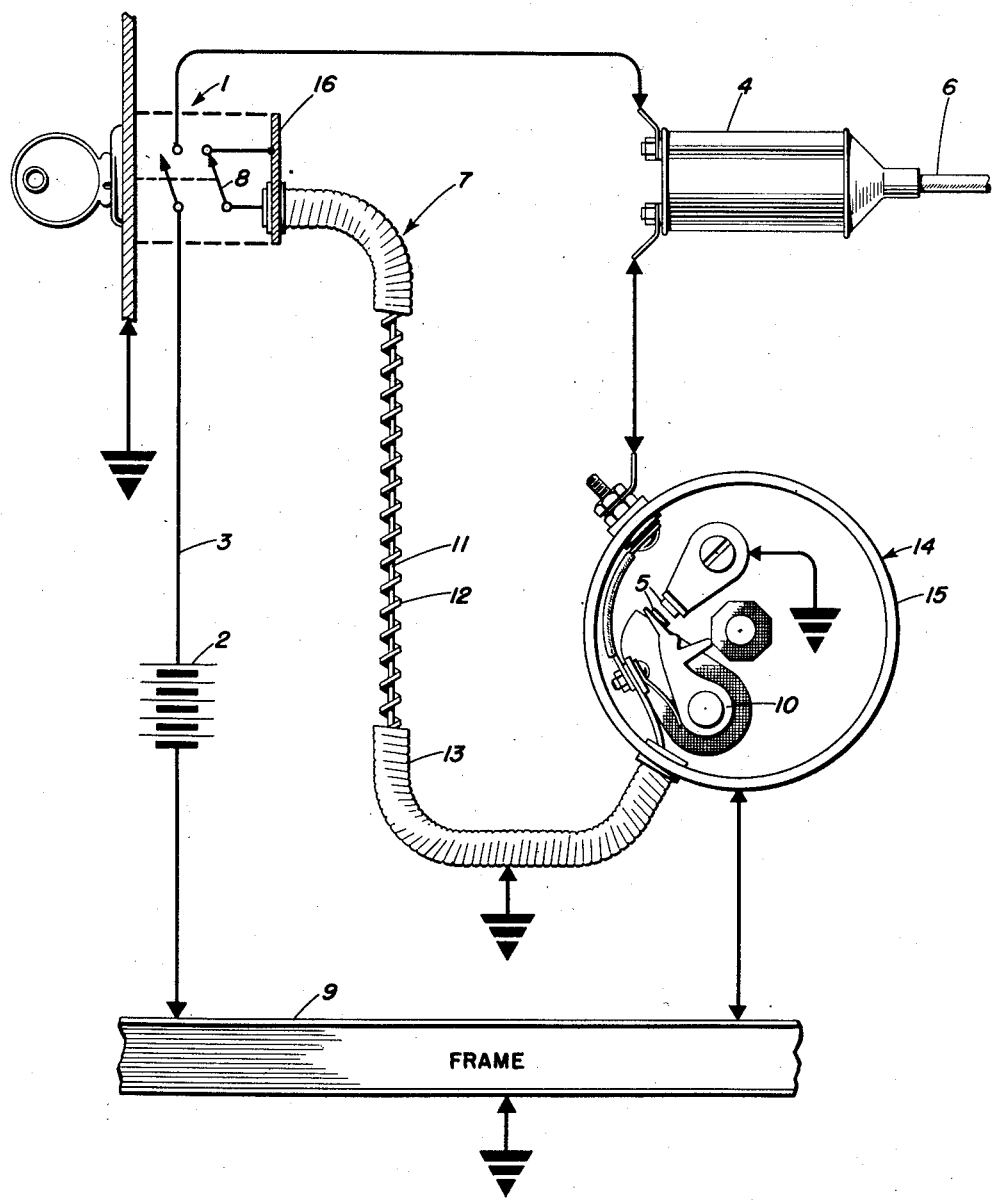
DAVID C. ROTH
INVENTOR
BY *Walter G. Finch*
ATTORNEY

United States Patent Office 2,820,149
Patented Jan. 14, 1958

2,820,149

APPARATUS FOR PREVENTING THEFT OF A VEHICLE

David C. Roth, Pikesville, Md.

Application April 15, 1957, Serial No. 652,877

3 Claims. (Cl. 307—10)

This invention relates generally to short circuiting devices and, more particularly, it pertains to an arrangement for preventing the theft of a motor vehicle.

It is common for an automobile to be stolen by operating the engine of the motor vehicle by means of what is commonly called "hot wiring." Conventionally, when the ignition switch of the motor vehicle is unlocked and placed in an "on" position, an electrical current from the battery of the motor vehicle is applied, by means of the electrical wiring system of the vehicle, to the primary winding of the ignition coil.

This current passes through the primary winding of the ignition coil to the distributor breaker points. These breaker points interrupt the flow of current in the primary winding of the ignition coil when the engine is cranked, with the interrupted flow of current causing, by induction, a high voltage to be produced in the secondary winding of the ignition coil. This high voltage is applied to the spark plugs of the engine, thus permitting the engine to operate.

By the technique of "hot wiring" or applying a current to the primary winding of the ignition coil by means of a wire directly from the battery of the vehicle to the ignition coil, instead of through the ignition switch and the electrical wiring system of the vehicle, as previously described, the engine may be operated without unlocking the ignition switch, thus facilitating the theft of the vehicle.

It is an object of this invention to provide an arrangement which can be utilized to prevent the theft of a motor vehicle by operating the engine of the motor vehicle without unlocking the ignition switch, such as in the practice of "hot wiring."

Another object of this invention is to provide an arrangement which can be utilized to render the engine of a motor vehicle inoperative in case theft thereof is attempted by means of what is commonly called the "hot wiring" technique.

Still another object of this invention is to provide an arrangement which can be utilized to prevent the theft of a motor vehicle in such a way as not to affect the normal operation of the vehicle.

Other objects of this invention are to provide an arrangement for preventing the theft of a motor vehicle that is economical to manufacture, easy to install and maintain, and that is efficient and reliable in operation.

Still other objects and many of the attendant advantages of this invention will be apparent by reference to the following detailed description, taken in conjunction with the single accompanying drawing in which the electrical wiring arrangement of a motor vehicle is illustrated incorporating the features of this invention.

Referring now to the single figure of the drawing, there is illustrated the electrical circuitry of a motor vehicle which utilizes an especially constructed wire 7 connected between the ignition switch 1 at the dashboard of the vehicle located in a housing 16 and the distributor 14 to cause a short circuit of the breaker points 5 of the distributor.

More specifically, this wire 7 is connected between the breaker points 5 of the distributor and an added section 8 of the ignition switch 1. This added section 8 of the ignition switch 1 is arranged to be a closed circuit when the ignition switch 1 is in an "off" position.

As shown, one side of the battery 2 of the motor vehicle is connected to a metal frame 9 of the vehicle, which is ground, and the other side of the battery 2 is connected to the electrical wiring system 3 of the vehicle which extends from the battery 2 to the ignition switch 1 and thence to the ignition coil 4 having a lead 6 for the connection to the spark plugs of the engine and from ignition coil 4 to the distributor 14 back to the automobile frame 9, as shown by the lines with arrows on each end.

Any connection between the electrical wiring system 3 and the metal frame or body 9 of the motor vehicle, which usually known as the ground side of battery 2, is termed a short circuit. A direct short circuit in the system will cause the battery 2 to be over-loaded, with possible damage to the battery or the burning out of the fused circuit.

In the present arrangement, the current from the battery 2 passes through the ignition coil 4 before arriving at the breaker points 5 in the distributor 14. The ignition coil 4 limits the amount of current flowing, so that no damage results to the battery 2 and no fused circuit is burned out.

A closed circuit, therefore, is provided between the ungrounded breaker point 10 of the distribhtor and the car frame 9, with a short circuit of the distributor breaker points 5. This short circuit prevents the breaker points 5 of the distributor 14 from interrupting the current flow in the primary winding of the ignition coil 4, and, therefore, no ignition high voltage is produced through the lead 6.

The construction of wire 7 will now be explained. A wire 11, hereafter called the inner conductor, is wrapped with a strip of suitable insulation 12 in such a manner as to leave a spacing between adjacent turns of the wrapping. The insulation 12 is arranged to be under a tension so that upon cutting the wire 7, the insulation 12 is caused to slide along the inner conductor 11 to expose the surface of the inner conductor 11 to an outer wrapper 13 of the special wire 7. The outer wrapper 13 consists of a steel casing constructed so as to be flexible. When this steel casing 13, the insulation 12, and the inner conductor 11 are cut, this allows the inner conductor 11 to touch the steel casing 13, thereby causing a short circuit.

At the distributor 14, the inner conductor 11 of the special wire is attached to the ungrounded breaker point 10 and the steel casing 13 of the special wire 7 is welded to the casing 15 of the distributor. At the ignition switch 1, the inner conductor 11 is attached to the above mentioned added section 8 of the ignition switch and the steel casing 13 of the special wire 7 is welded to the steel can 16 which closes the ignition switch 1.

By means of this special wire 7 connected as described, the breaker points 5 of the distributor are short circuited when the ignition switch is in an "off" position or locked position. Any attempt to remove the short circuit by cutting the special wire 7 results in a permanent short circuit due to the construction of the special wire 7 as pointed out above.

Obviously, many modifications and variations of this invention are possible in the light of the foregoing teachings. Therefore, it is to be understood that within the scope of the appended claims, this invention may be practiced otherwise than as specifically described.

What is claimed is:

1. An arrangement for preventing the theft of a motor vehicle, comprising, a battery, an ignition switch means located in a metal casing, an ignition coil and a distributor having a pair of breaker points connected in an electrical system to the frame of said motor vehicle, said ignition switch means including a pair of switches, one of said switches being arranged to be connected in said electrical system when the ignition system is turned on and the other switch being arranged to be connected in a closed circuit when the ignition system is turned off, and means connected between said second switch and said distributor to cause a permanent short circuit of the ignition system when the ignition system is off.

2. An arrangement for preventing the theft of a motor vehicle, comprising, a battery, an ignition switch means in a metal casing, an ignition coil and a distributor with a pair of breaker points connected in an electrical system to the frame of said motor vehicle, said ignition switch means including a metal casing having a pair of switches, one of said switches being arranged to be connected in said electrical system when the ignition system is turned on and the other switch being arranged to be connected in a closed circuit including said casing when the ignition system is turned off, and means including a wire having spaced inner and outer conductors connected between said ignition switch means and said distributor to cause a short circuit of the distributor breaker points when said ignition system is off, with an insulation material having spacing between adjacent wrappings located about said inner conductor and between said inner and outer conductors, said inner conductor being connected to said other switch of said ignition switch means and to the ungrounded breaker point of said distributor, said outer conductor being connected to said casing of said ignition switch means and the casing of said distributor, whereby the breaker points of said distributor are short circuited when the one ignition switch is in an off position and a permanent short circuit is created when said wire is cut to cause said inner conductor to contact said outer conductor.

3. An arrangement as set forth in claim 2, wherein said insulation material between said inner and outer conductors is under tension so that upon being cut it slides along the inner conductor to expose the latter to the outer conductor.

No references cited.